US009205883B2

(12) United States Patent
Bennett et al.

(10) Patent No.: US 9,205,883 B2
(45) Date of Patent: Dec. 8, 2015

(54) TANK TRAILER HAVING AN ADJUSTABLE KINGPIN ASSEMBLY

(71) Applicant: SOUTHERN FRAC, LLC, Waxahachie, TX (US)

(72) Inventors: Nathan A. Bennett, Alvarado, TX (US); James D. Leonard, Alvarado, TX (US)

(73) Assignee: Southern Frac, LLC, Waxahachie, TX (US)

( * ) Notice: Subject to any disclaimer, the term of this patent is extended or adjusted under 35 U.S.C. 154(b) by 54 days.

(21) Appl. No.: 14/095,619

(22) Filed: Dec. 3, 2013

(65) Prior Publication Data

US 2015/0151800 A1 Jun. 4, 2015

(51) Int. Cl.
*B62D 53/08* (2006.01)
*B62D 53/06* (2006.01)
*B60D 1/01* (2006.01)

(52) U.S. Cl.
CPC .............. *B62D 53/085* (2013.01); *B60D 1/015* (2013.01); *B62D 53/062* (2013.01); *B62D 53/0842* (2013.01)

(58) Field of Classification Search
CPC .... B62D 53/06; B62D 53/08; B62D 53/0821; B62D 53/0842; B62D 53/0871; B62D 53/0885; B62D 53/0807; B62D 53/061; B60D 1/465; B60D 1/36; B60D 1/43; B60D 1/015; B60D 1/245; B60D 1/50; B60D 1/60; B60D 1/249
See application file for complete search history.

(56) References Cited

U.S. PATENT DOCUMENTS

| | | | | | |
|---|---|---|---|---|---|
| 2,020,161 | A | * | 11/1935 | Robb | 280/428 |
| 2,441,710 | A | * | 5/1948 | Martin | 414/537 |
| 2,590,210 | A | * | 3/1952 | Rogers | 414/481 |
| 2,821,409 | A | * | 1/1958 | Chalmers | 280/440 |
| 2,826,421 | A | * | 3/1958 | Mueller | 280/832 |
| 3,095,987 | A | * | 7/1963 | Sable | 410/1 |
| 3,208,770 | A | * | 9/1965 | Freitas et al. | 280/440 |
| 3,884,503 | A | * | 5/1975 | Damm | 280/440 |
| 4,566,716 | A | * | 1/1986 | Modat | 280/439 |
| 4,961,564 | A | * | 10/1990 | Schult et al. | 267/64.22 |
| 5,785,341 | A | * | 7/1998 | Fenton | 280/441 |
| 7,530,591 | B2 | * | 5/2009 | Mater et al. | 280/507 |
| 7,712,761 | B2 | * | 5/2010 | Mater et al. | 280/474 |
| 7,810,831 | B2 | * | 10/2010 | Wilkens et al. | 280/423.1 |
| 2008/0296867 | A1 | * | 12/2008 | Bouwkamp et al. | 280/439 |

FOREIGN PATENT DOCUMENTS

GB          860492 A  *  2/1961

OTHER PUBLICATIONS

Photographs of Tank Trailer; Date Unknown, 3 pgs.

* cited by examiner

*Primary Examiner* — Tony Winner
(74) *Attorney, Agent, or Firm* — Christie, Parker & Hale, LLP

(57) ABSTRACT

A trailer having an adjustable kingpin assembly configured to adjust a ground clearance of the trailer. The adjustable kingpin assembly is configured to be detachably connected to a fifth wheel on a truck or tractor. The trailer includes a pivot frame having a kingpin pivotally coupled to a trailer. The pivot frame is configured to pivot between a first angular position and a second angular position to adjust a ground clearance of the trailer. The adjustable kingpin assembly also includes a rocker plate assembly pivotally coupled to the pivot frame and at least one bladder engaging the rocker plate assembly to rotate the pivot frame between the first angular position and the second angular position. The rocker plate assembly is configured to pivot to compensate for the pivoting of the pivot frame between the first and second angular positions.

19 Claims, 17 Drawing Sheets

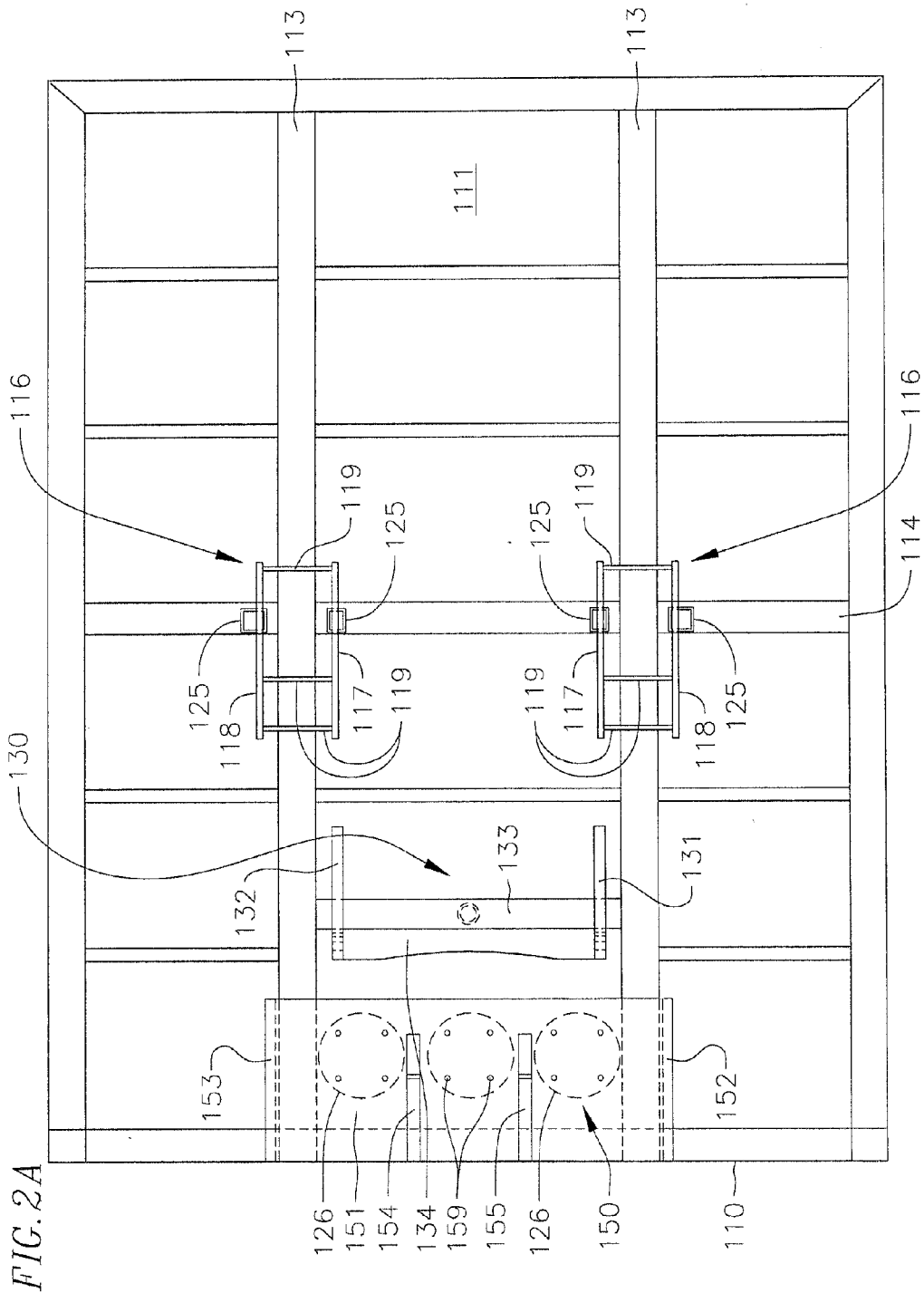

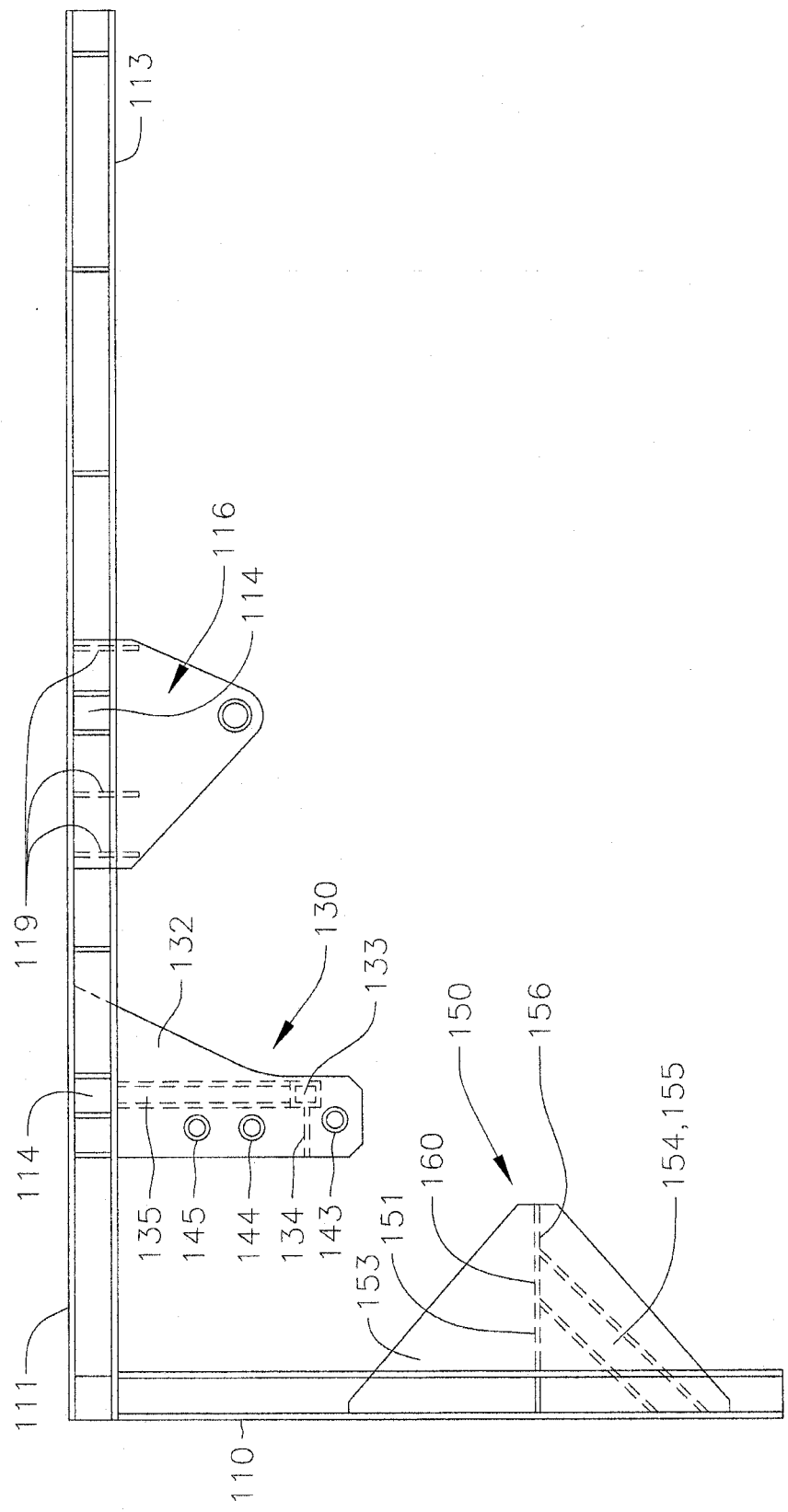

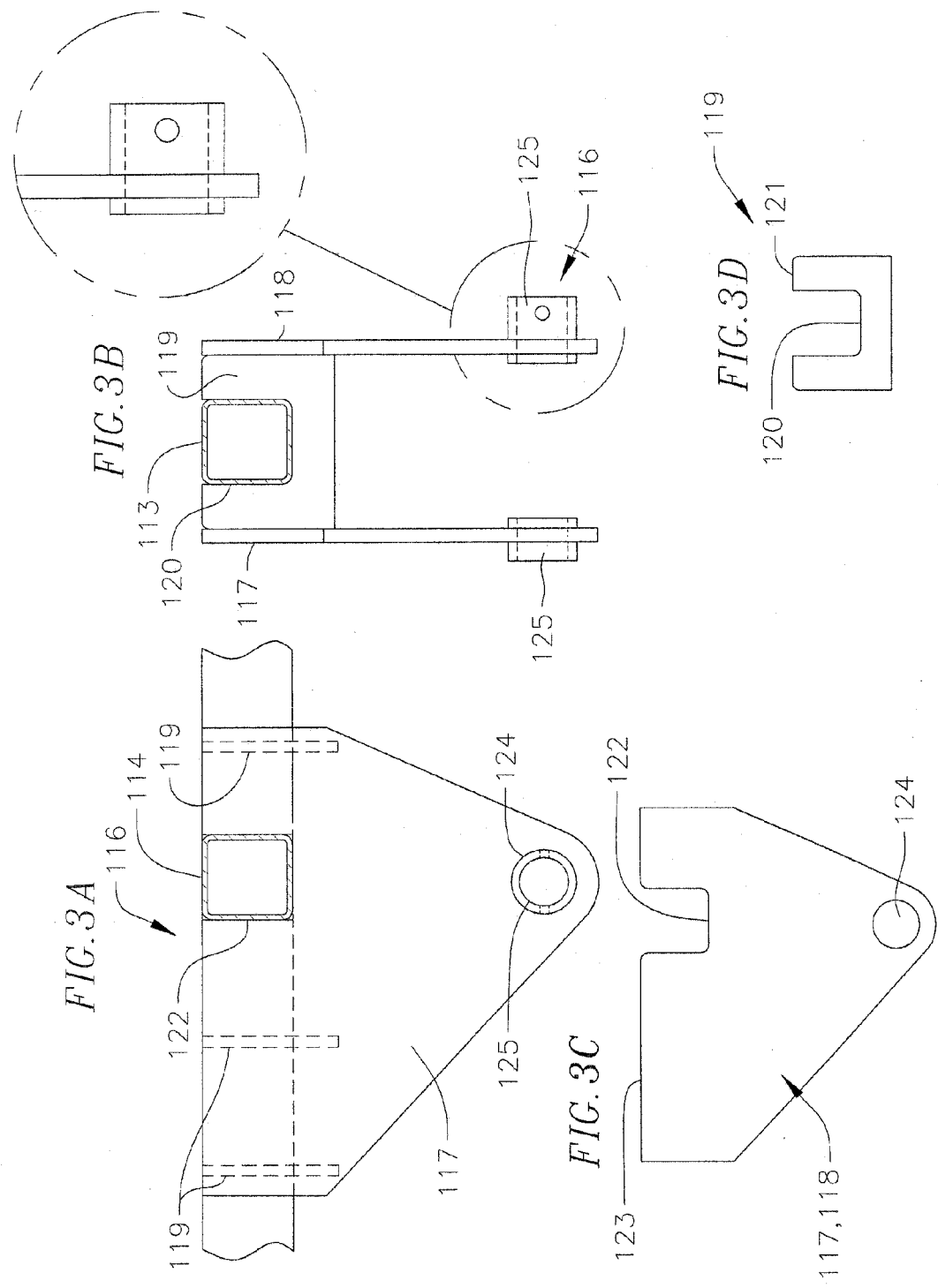

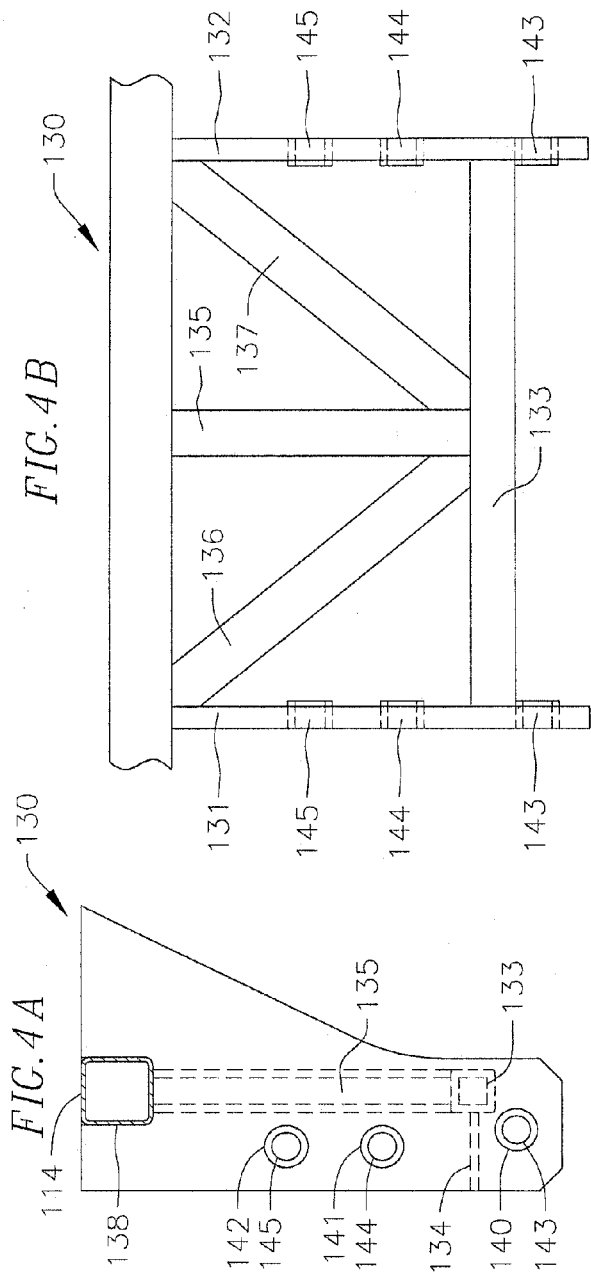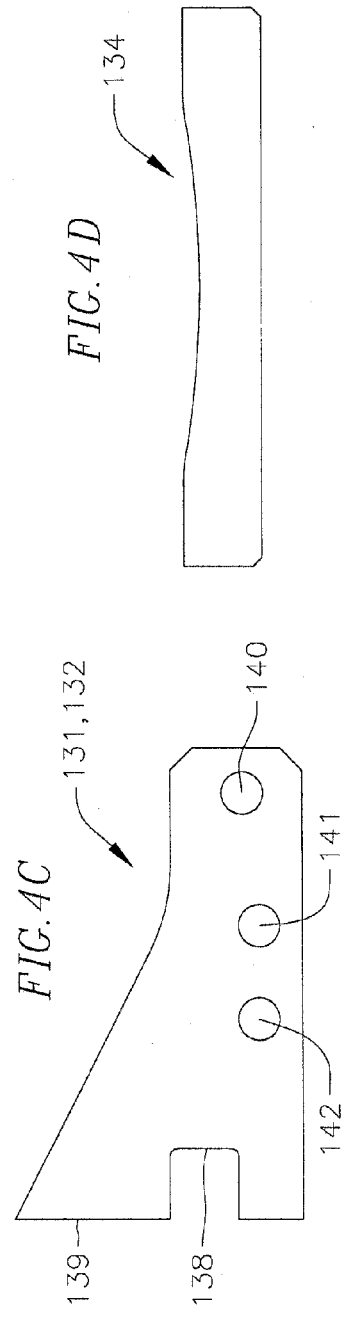

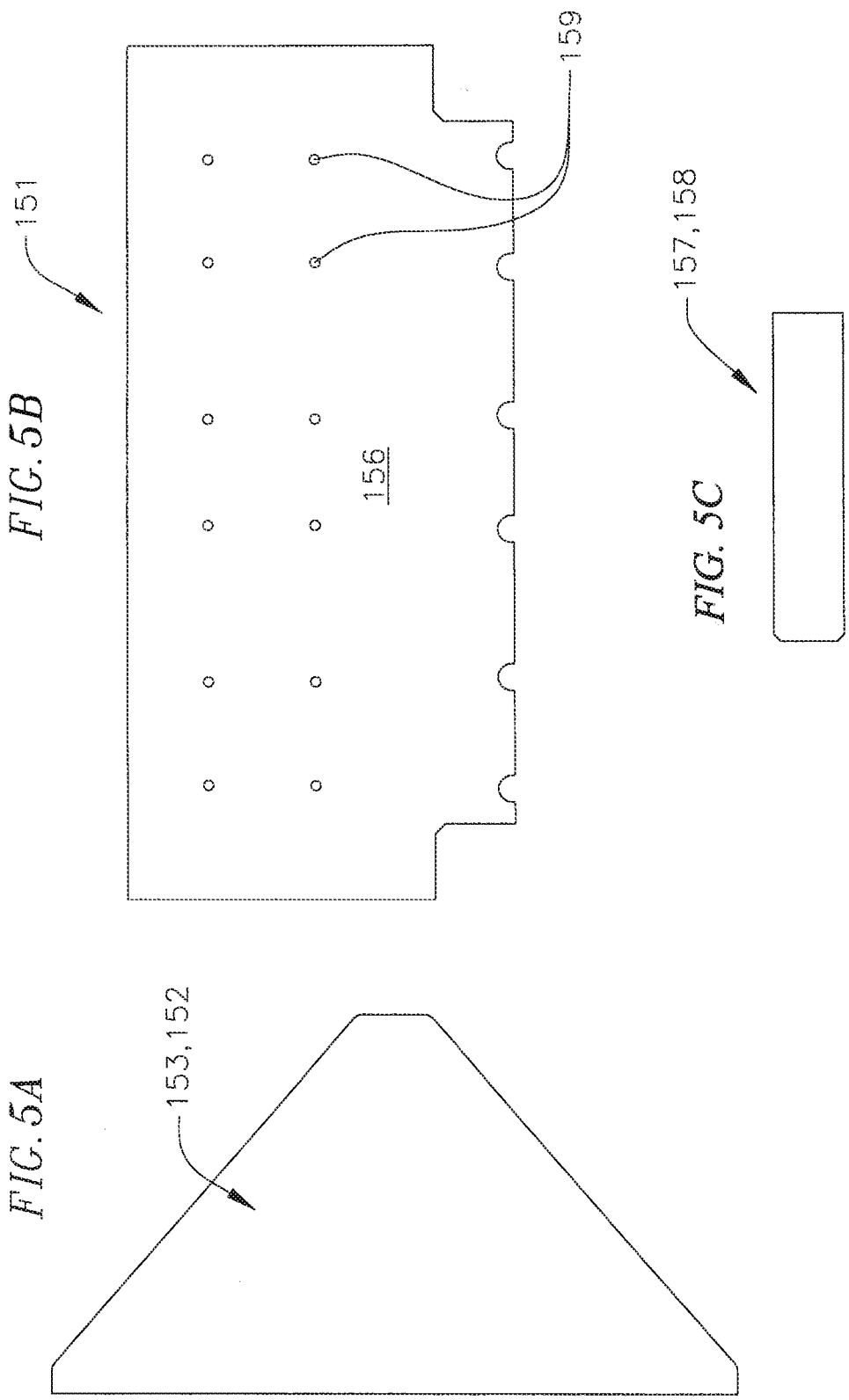

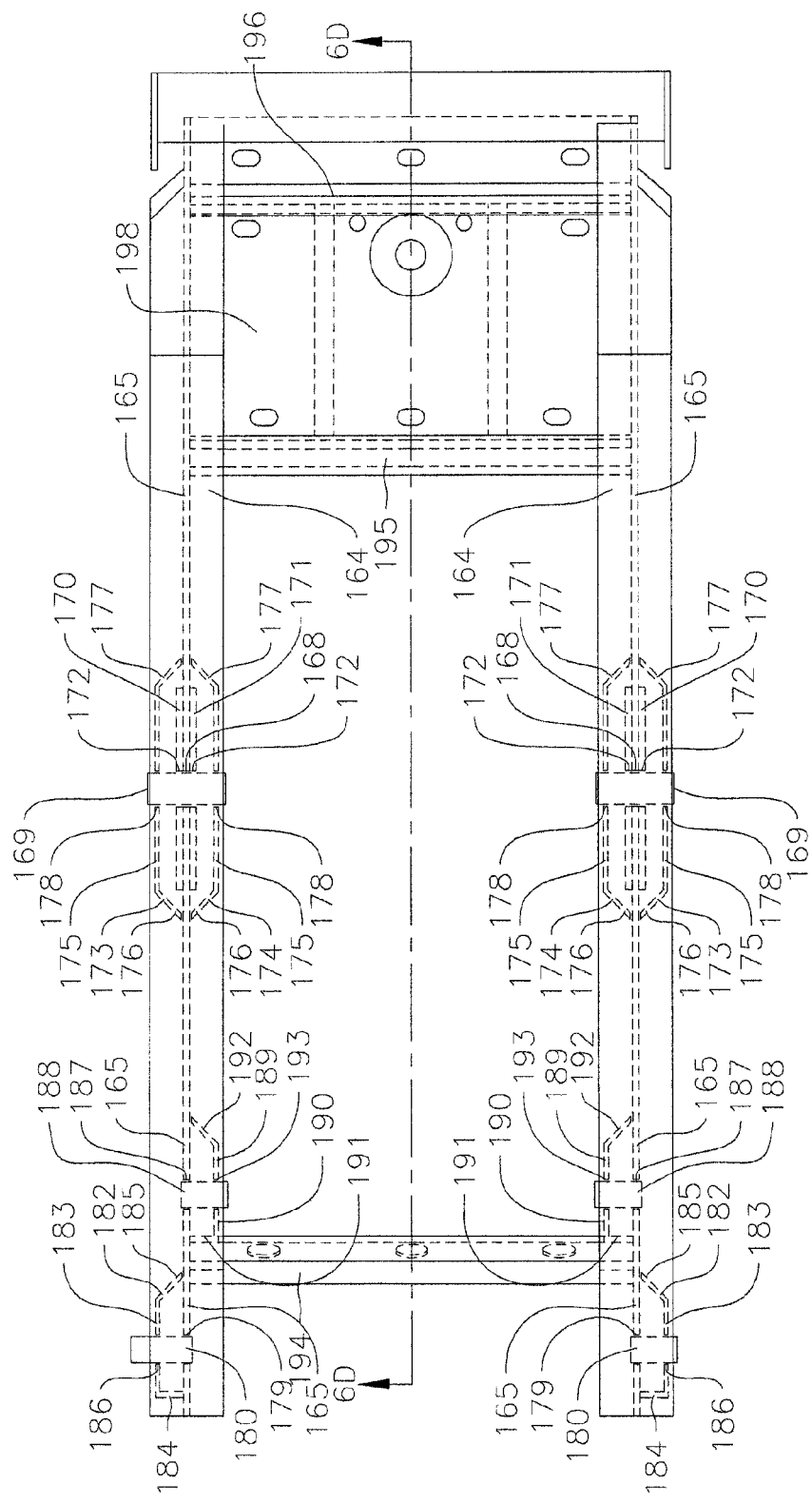

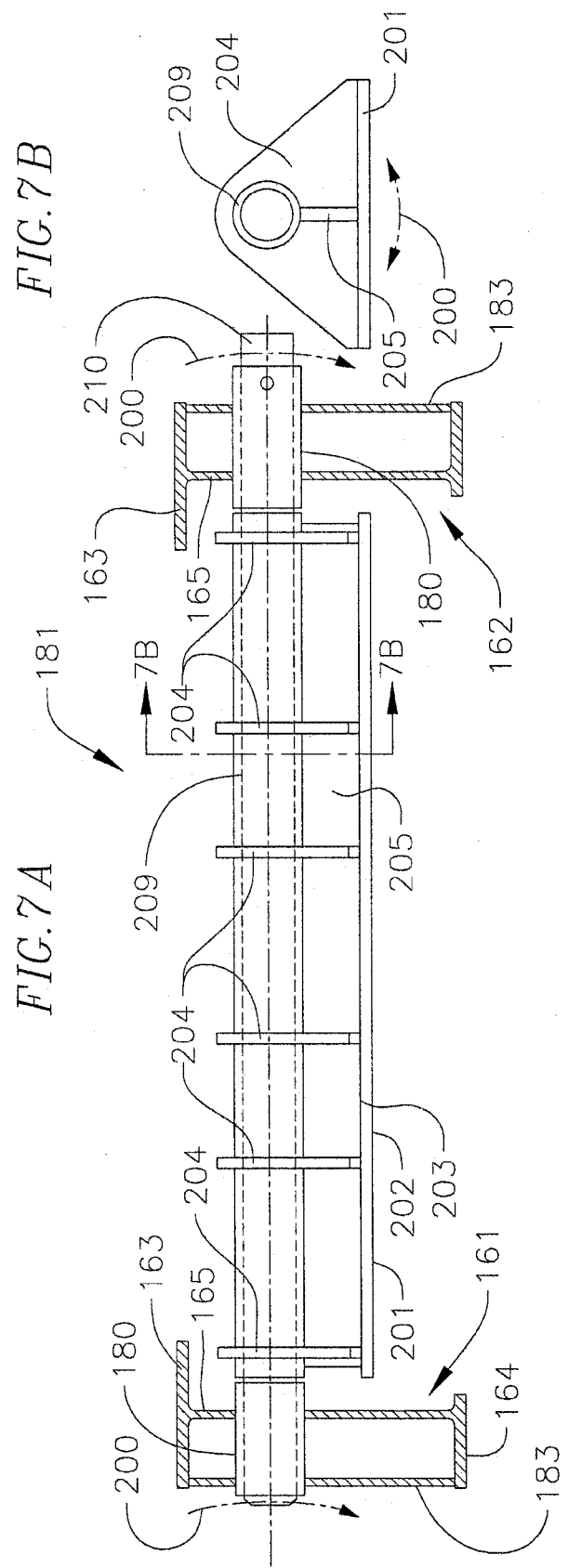

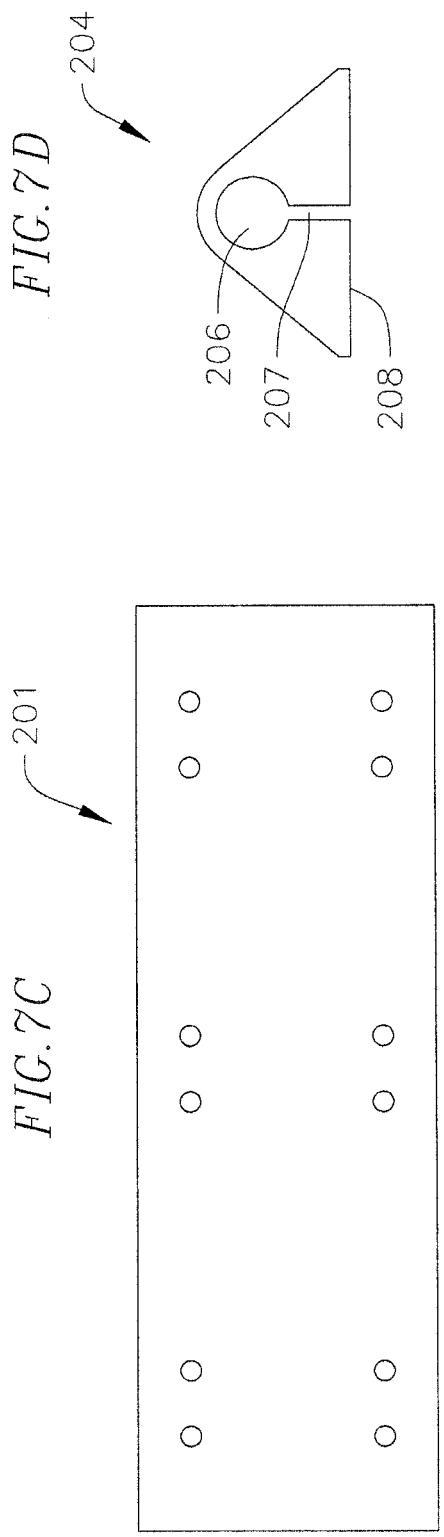

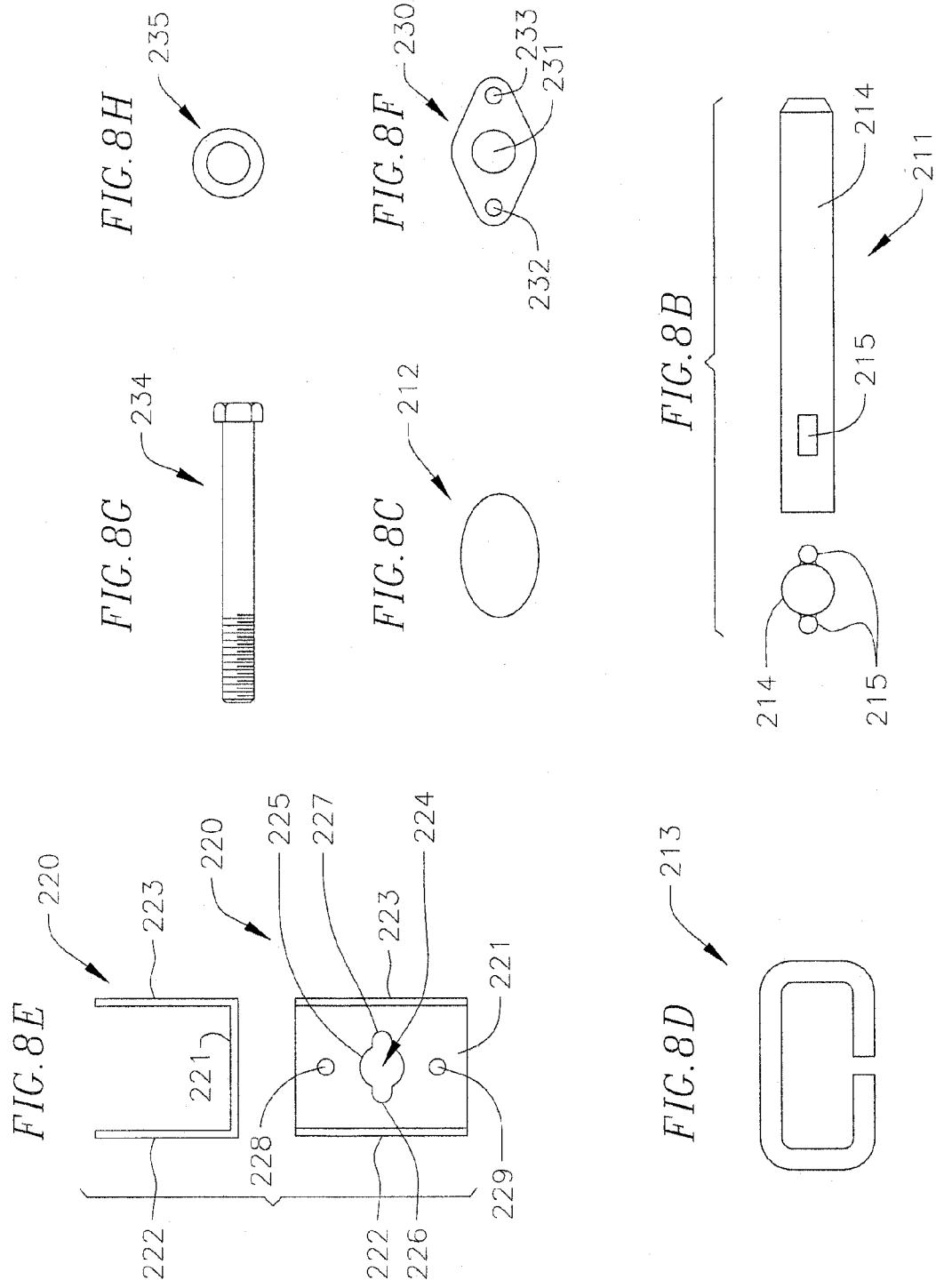

TANK TRAILER HAVING AN ADJUSTABLE KINGPIN ASSEMBLY

FIELD

The present invention relates generally to trailers and, more particularly, to trailer kingpin assemblies.

BACKGROUND

Trailers commonly include a kingpin configured to attach to a fifth wheel assembly on a truck or tractor. The engagement between the fifth wheel assembly and the kingpin enables the truck or tractor to securely tow the trailer. Some conventional trailers include an adjustable kingpin assembly configured to pivot to adjust the ground clearance of the trailer. These adjustable kingpin assemblies may include a series of airbags or bladders configured to adjust the position of the kingpin assembly to achieve the desired ground clearance of the trailer. Accordingly, the adjustable kingpin assemblies enable the trailer to be positioned on the ground at a worksite, such as a hydraulic fracturing site, and then lifted off of the ground to facilitate transportation of the trailer to another location. The adjustable kingpin assemblies may also be configured to adjust the trailer between a relatively low ground clearance position and a relatively higher ground clearance position. For instance, it may be desirable to adjust the trailer into a relatively lower ground clearance position when the trailer is being transported on a highway, so that the trailer may safely pass under overpasses and through tunnels. In contrast, it may be desirable to adjust the trailer into a relatively higher ground clearance position when the trailer is being transported off-road or on other uneven terrain.

Conventional kingpin assemblies also include a ratchet mechanism configured to lock the adjustable kingpin assembly into the desired position based upon the desired ground clearance of the trailer. However, the ratchet mechanisms on conventional adjustable kingpin assemblies are prone to wear, which may cause the adjustable kingpin assembly to prematurely fail. Additionally, the engagement between the airbags and conventional adjustable kingpin assemblies is not completely maintained as the conventional kingpin assembly pivots into different opinions (i.e., conventional kingpin assemblies are not configured to compensate for the different angles between the kingpin assembly and the airbags due to the rotation of the kingpin assembly into different positions). Such angular misalignment between the airbags and the adjustable kingpin assembly may reduce the efficacy of the airbags or bladders in pivoting the kingpin assembly into different angular positions and may cause premature wear and failure of the airbags.

SUMMARY

The present disclosure is directed to various embodiments of a trailer having an adjustable kingpin assembly. In one embodiment, the trailer includes a pivot frame including a kingpin pivotally coupled to the trailer. The pivot frame is configured to pivot between a first angular position and a second angular position to adjust a ground clearance of the trailer. The trailer also includes a rocker plate assembly pivotally coupled to the pivot frame, and at least one bladder engaging the rocker plate assembly to rotate the pivot frame between the first angular position and the second angular position. The rocker plate assembly is configured to pivot to compensate for the pivoting of the pivot frame between the first and second angular positions. The trailer may be any suitable type of trailer, such as a fluid storage tank.

In one embodiment, the trailer also includes at least one clevis coupled to the trailer. The pivot frame is pivotally coupled to the at least one clevis such that the pivot frame is configured to pivot between the first and second angular positions. In one embodiment, the trailer includes a support assembly coupled to the trailer. The support assembly is configured to support the at least one bladder. In one embodiment, the trailer further includes at least one spring-loaded latch pin configured to selectively lock the pivot frame into the first angular position and the second angular position to set the desired ground clearance of the trailer. In one embodiment, the trailer also includes at least one latch bracket coupled to the trailer. The latch bracket is configured to receive the at least one spring-loaded latch pin.

In another embodiment, the trailer includes a pivot frame including a kingpin pivotally coupled to the trailer. The pivot frame is configured to pivot between a first angular position and a second angular position to adjust a ground clearance of the trailer. The trailer also includes at least one bladder configured to rotate the pivot frame between the first angular position and the second angular position and at least one spring-loaded latch pin configured to selectively lock the pivot frame into the first angular position and the second angular position to set the desired ground clearance of the trailer.

In one embodiment, the at least one spring-loaded latch pin includes a pin configured to slide between a latched position and an unlatched position. The pin includes a primary rod and at least one lock-out rod coupled to the primary rod. The at least one lock-out rod is configured to lock the pin in the unlatched position. In one embodiment, the at least one spring-loaded latch pin further includes a latch bracket defining a keyhole-shaped opening. The at least one lock-out rod is configured to pass through the keyhole-shaped opening when the pin is in the latched position and is configured not to pass through the keyhole-shaped opening when the pin is in the unlatched position. In one embodiment, the at least one spring-loaded latch pin further includes at least one guide pin coupled to the pin and a spring wound around the at least one guide pin. The spring is configured to bias the pin into the latched position.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIGS. 2A-2C are bottom, side, and front views, respectively, of the tank trailer of FIGS. 1A-1C;

FIGS. 3A and 3B are a side view and a front view, respectively, of a clevis according to one embodiment of the present disclosure;

FIG. 3C is a side view of a hinge plate according to one embodiment of the present disclosure;

FIG. 3D is a front view of a hinge gusset according to one embodiment of the present disclosure;

FIGS. 4A and 4B are a side view and a front view, respectively, of a latch assembly according to one embodiment of the present disclosure;

FIG. 4C is a side view of a latch plate according to one embodiment of the present disclosure;

FIG. 4D is a top view of a latch support brace according to one embodiment of the present disclosure;

FIGS. 5A-5C are a side view of a side support plate, a bottom view of a mounting plate, and a front view of a weld plate, respectively, according to one embodiment of the present disclosure;

FIGS. 6C and 6D are a top view and a cross-sectional view, respectively, of the pivot frame of FIGS. 6A and 6B;

FIGS. 7A and 7B are a front view and a side view of a rocker plate assembly according to one embodiment of the present disclosure;

FIGS. 7C, 7D, and 7E are a bottom view of an upper airbag mount plate, a side view of a gusset, and a front view of a stiffener, respectively, according to one embodiment of the present disclosure;

FIGS. 8B-8H are views of a pin, a handle plate, a handle, a latch bracket, a latch plate, a guide pin, and a stop ring, respectively, according to one embodiment of the present disclosure.

DETAILED DESCRIPTION

The present disclosure is directed to various embodiments of an adjustable kingpin assembly pivotally coupled to a trailer. The adjustable kingpin assembly is configured to be detachably coupled to a fifth wheel assembly on a truck or tractor such that the truck or tractor may securely tow the trailer. The adjustable kingpin assembly is configured to pivot into two or more different angular positions to achieve a desired ground clearance of the trailer. In one or more embodiments, the adjustable kingpin assembly is configured to compensate for the angular rotation of the adjustable kingpin assembly to maintain flush contact with a series of airbags or bladders configured to pivot the kingpin assembly into the different angular positions. Additionally, in one or more embodiments, the adjustable kingpin assembly is configured to be selectively locked into the different angular positions by one or more spring-loaded latch pins.

Figure 1A:
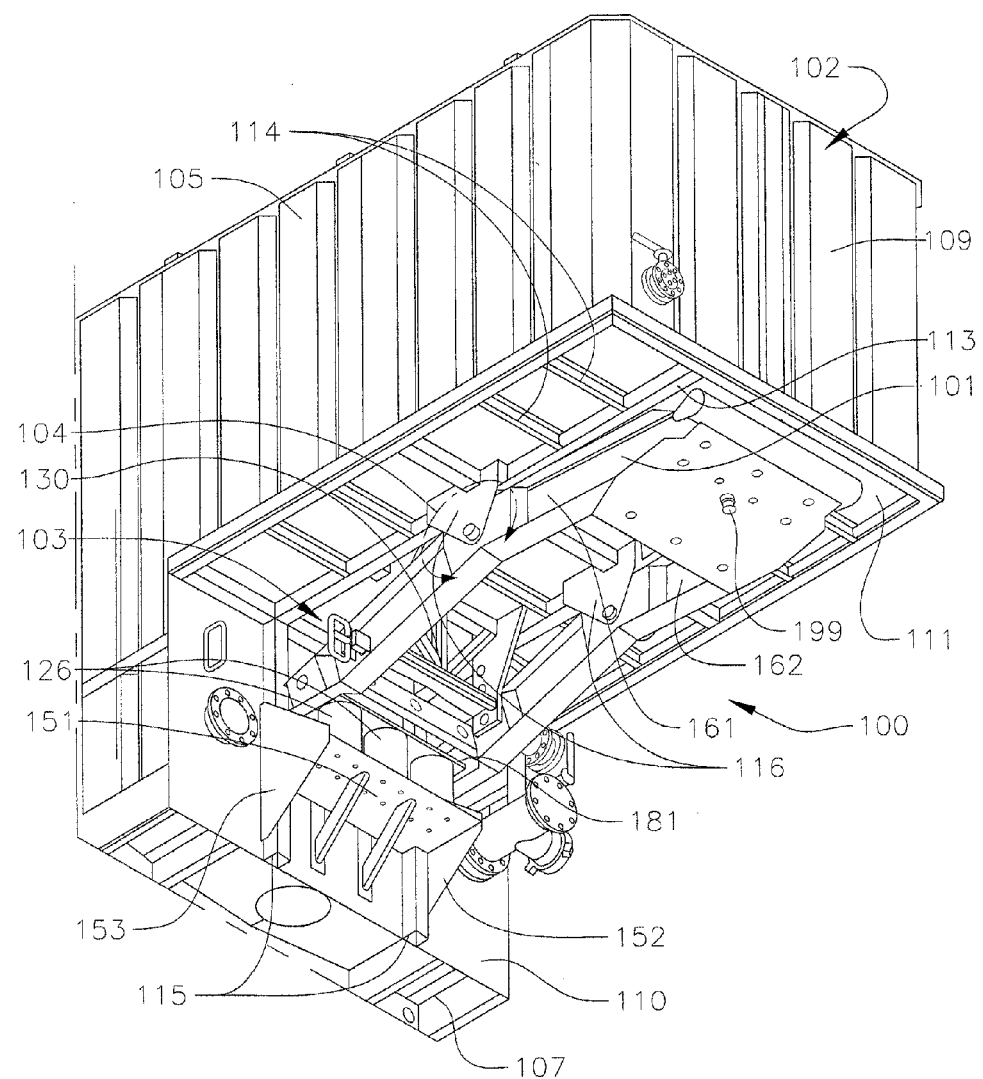
FIGS. 1A-1C are perspective, side, and front views, respectively, of an adjustable kingpin assembly coupled to a tank trailer according to one embodiment of the present disclosure.
Figure 1B:
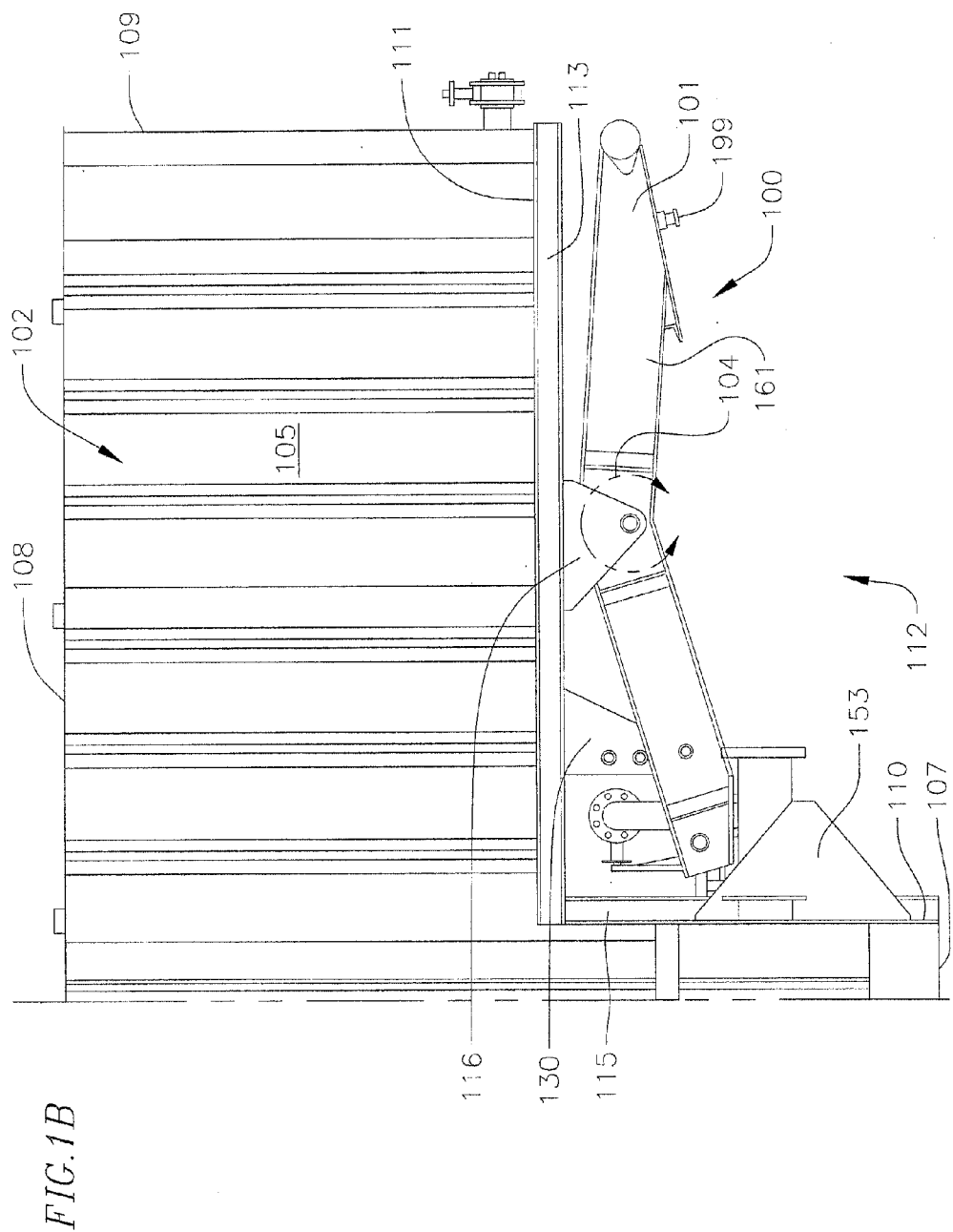
Figure 1C:
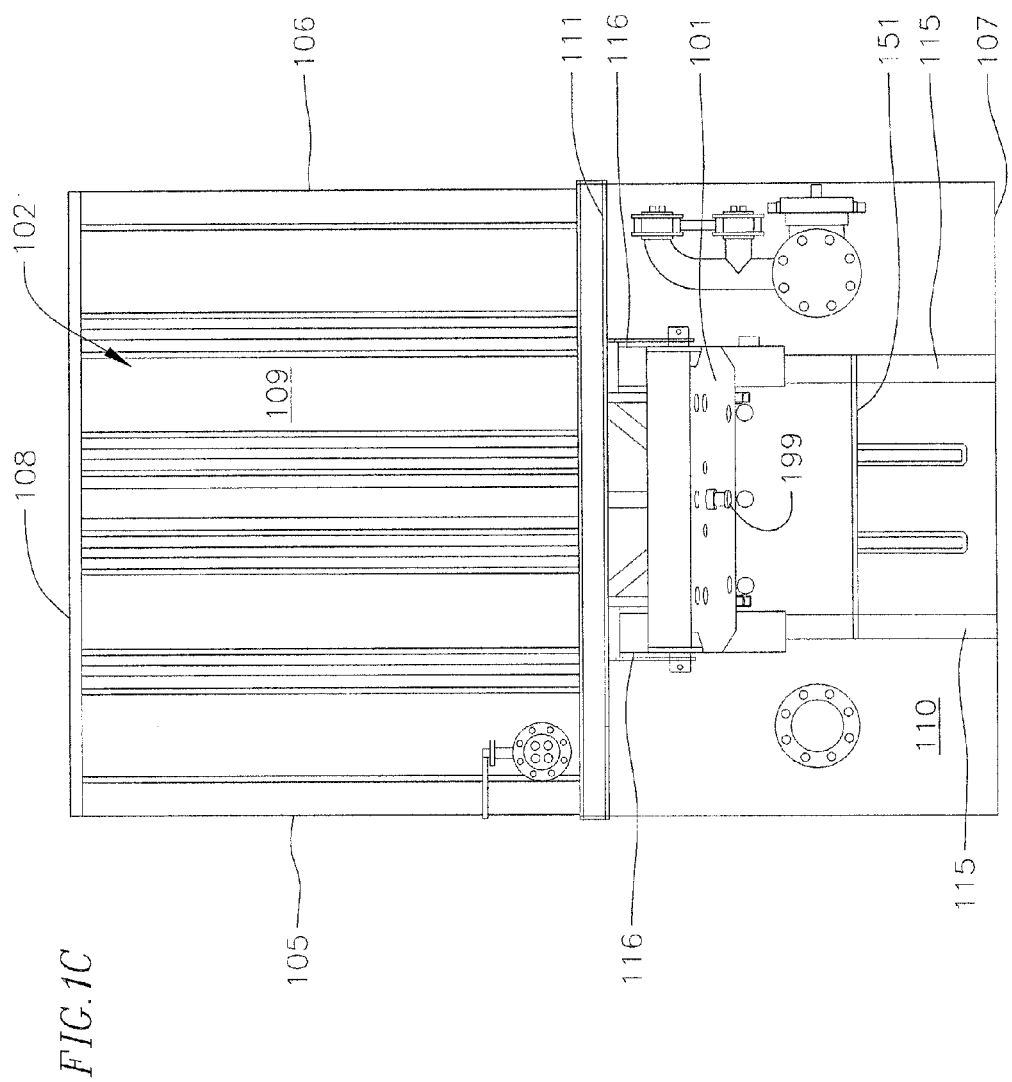

With reference now to FIGS. 1A-1C, an adjustable kingpin assembly 100 according to one embodiment of the present disclosure includes a pivot frame 101 pivotally coupled to a trailer 102, at least one bladder or airbag 126 configured to rotatably drive the pivot frame 101 into two or more different angular positions, and at least one spring-loaded latch pin assembly 103 (see FIG. 8A) configured to selectively lock the pivot frame 101 into the different angular positions. Rotation (arrow 104) of the pivot frame 101 is configured to adjust a ground clearance of the trailer 102 when the adjustable kingpin assembly 100 is coupled to a fifth wheel assembly on a truck or tractor (i.e., the rotation (arrow 104) of the pivot frame 101 is configured to lift a front end of the trailer 102 off the ground by a desired height so that the trailer 102 may be towed by the truck or tractor).

With continued reference to the embodiment illustrated in FIGS. 1A-1C, the trailer 102 is a fluid storage tank trailer 102 having a first vertical sidewall 105, a second vertical sidewall 106 spaced apart from the first vertical sidewall 105, a horizontal base 107 extending between lower ends of the vertical sidewalls 105, 106, a roof 108 extending between upper ends of the vertical sidewalls 105, 106, and a vertical front wall 109 extending between forward ends of the vertical sidewalls 105, 106. The fluid storage tank trailer 102 also includes an intermediate vertical wall 110 and an intermediate horizontal wall 111. Together, the intermediate walls 110, 111 define a cavity 112 configured to house the adjustable kingpin assembly 100. A portion of the fluid storage tank trailer 102 overhangs the cavity 112 and the adjustable kingpin assembly 100 housed therein. Although in the illustrated embodiment the adjustable kingpin assembly 100 is coupled to a fluid storage tank trailer 102, in one or more alternate embodiments, the adjustable kingpin assembly 100 of the present disclosure may be attached to any other suitable type of trailer 102.

Additionally, in the illustrated embodiment of FIG. 1A, the tank trailer 102 also includes a plurality of longitudinal support members 113 and a plurality of transverse support members 114 coupled to the intermediate horizontal wall 111. The trailer 102 also includes a series of vertical support members 115 coupled to the intermediate vertical wall 110. The support members 113, 114, 115 may have any suitable shape, such as, for instance, square or rectangular posts, I-beams, C-channels, or square or rectangular tubing. Additionally, the support members 113, 114, 115 may be coupled to the intermediate walls 110, 111 by any suitable means, such as, for instance, welding, bonding, fastening, or any combination thereof. As described in more detail below, the support members 113, 114, 115 are configured to facilitate attachment of the adjustable kingpin assembly 100 to the tank trailer 102.

With continued reference to the embodiment illustrated in FIGS. 1A-1C, the adjustable kingpin assembly 100 also includes a pair of clevises 116 coupled to, and extending downward from, the intermediate horizontal wall 111 of the tank trailer 102. Although in the illustrated the tank trailer 102 includes two devises 116, in one or more alternate embodiments, the trailer 102 may include any other suitable number of clevises 116, such as, for instance, from one to four clevises 116. The devises 116 are configured to pivotally couple the pivot frame 101 to the tank trailer 102 such that the pivot frame 101 may rotate (arrow 104) into different angular positions and thereby adjust the ground clearance of the front end of the tank trailer 102.

With reference now to the embodiment illustrated in FIGS. 2A-3D, each clevis 116 includes a pair of spaced apart hinge plates 117, 118 and a plurality of hinge gussets 119 extending between and interconnecting the hinge plates 117, 118. In the illustrated embodiment, each clevis 116 includes three hinge gussets 119, although in one or more alternate embodiments, each clevis 116 may include any other suitable number of hinge gussets 119, such as, for instance, from one to five hinge gussets 119. In the illustrated embodiment, each hinge gusset 119 is a generally rectangular plate, although the hinge gussets 119 may have any other suitable shape and still fall within the scope and spirit of the present disclosure. Each hinge gusset 119 defines a rectangular notch 120 in an upper edge 121 of the hinge gusset 119. The notches 120 in the hinge gussets 119 are configured to receive the longitudinal support members 113 on the intermediate horizontal wall 111 of the tank trailer 102. Accordingly, the hinge gussets 119 may be coupled to the intermediate horizontal wall 111 and/or the longitudinal support members 113 of the tank trailer 102 by any suitable means, such as, for instance, welding, bonding, fastening, or any combination thereof.

Still referring to the embodiment illustrated in FIG. 2A-3D, each hinge plate 117, 118 is a generally triangular plate, although the hinge plates 117, 118 may have any other suitable shape and still fall within the scope and spirit of the present disclosure. Each hinge plate 117, 118 defines a rectangular notch 122 in an upper edge 123 of the hinge plate 117, 118. The rectangular notches 122 in the hinge plates 117, 118 are configured to receive one of the transverse support members 114 on the intermediate horizontal wall 111 of the tank trailer 102. Accordingly, the hinge plates 117, 118 may be coupled to the intermediate horizontal wall 111 and/or the transverse support members 114 of the tank trailer 102 by any suitable means, such as, for instance, welding. Each hinge plate 117, 118 also defines an opening 124 (e.g., a hole). In the illustrated embodiment, the openings 124 in the hinge plates 117, 118 are each configured to receive a bushing 125 (e.g., a tubing bushing). As described in more detail below, the bushings 125 accept and support one or more shafts about which the pivot frame 101 is configured to pivot (arrow 104) into different angular positions.

Figure 2C:
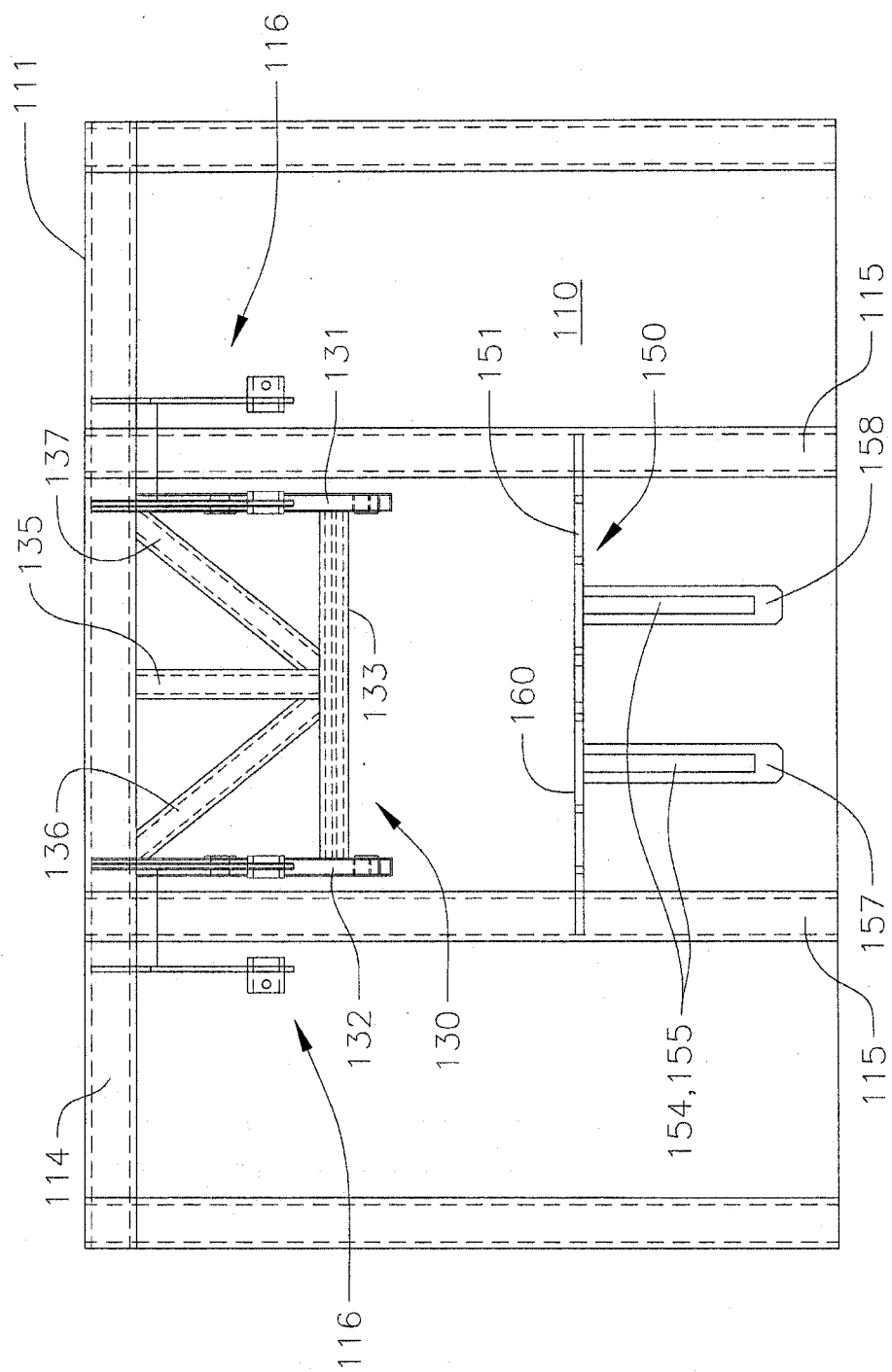
Figure 6A:
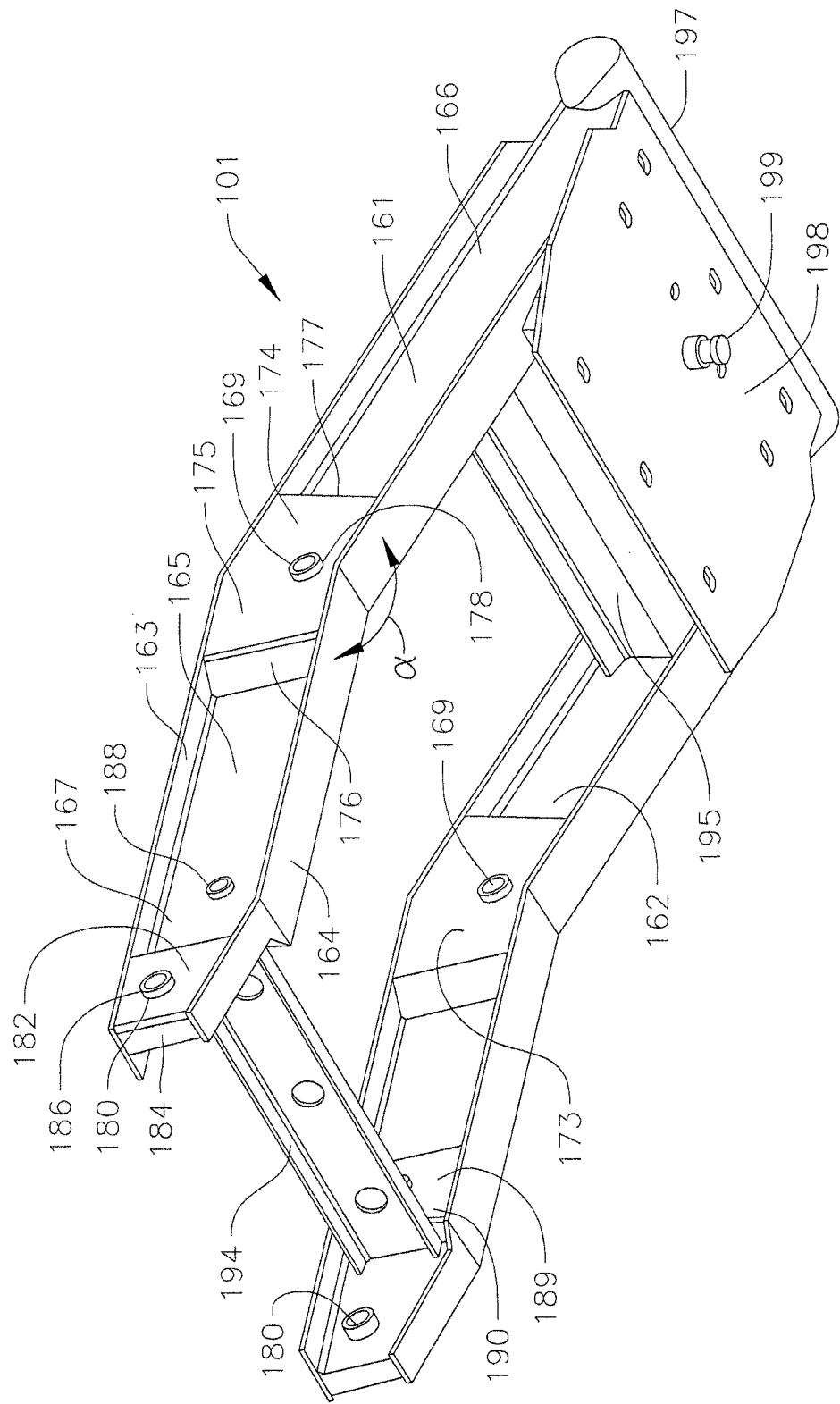
FIGS. 6A and 6B are lower and upper perspective views, respectively, of a pivot frame according to one embodiment of the present disclosure.
Figure 6B:
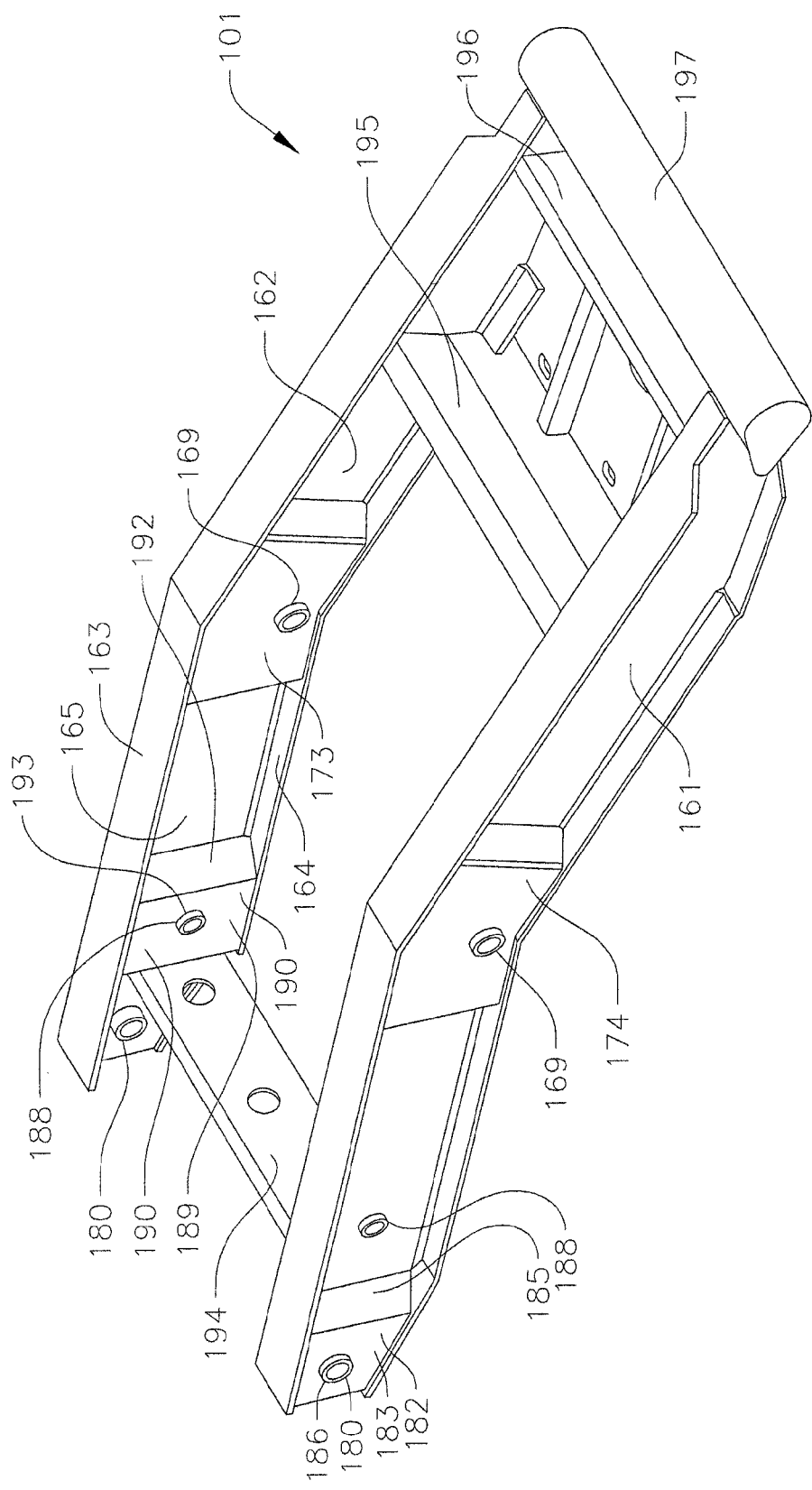
Figure 6D:
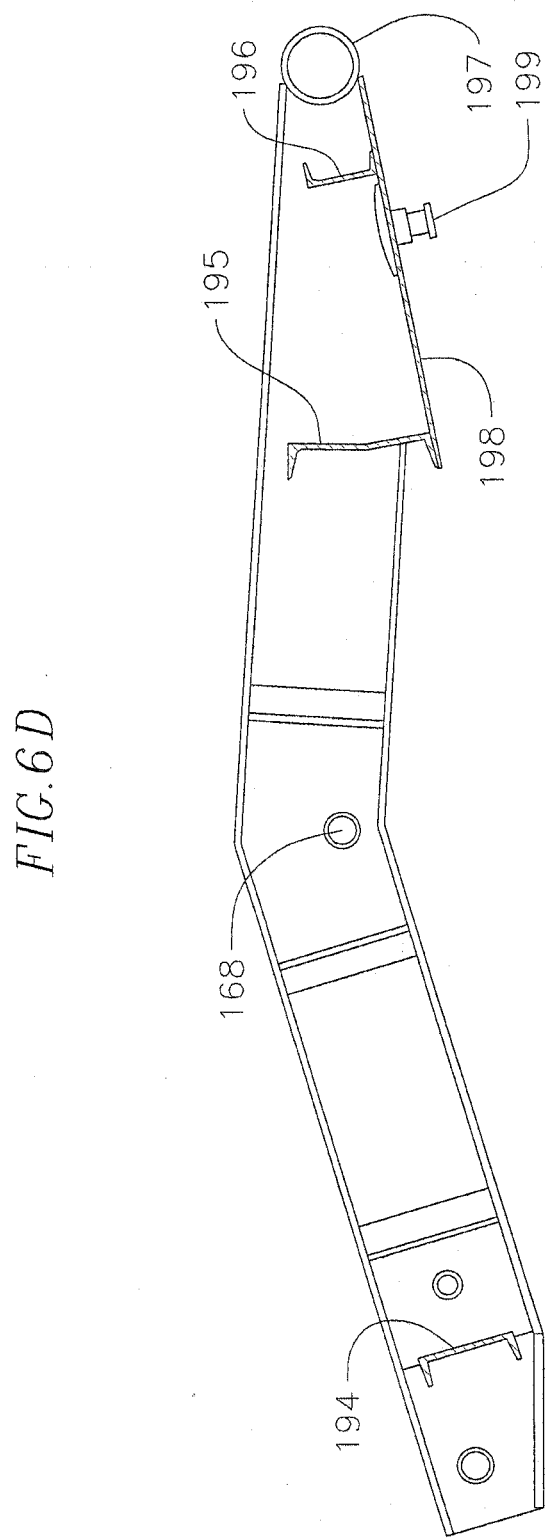

With reference now to the embodiment illustrated in FIGS. 2A-2C, the adjustable kingpin assembly 100 also includes a latch assembly 130 coupled to, and extending downward from, the intermediate horizontal wall 111 of the tank trailer 102. As described in detail below, the latch assembly 130 is configured to enable a user to selectively lock the pivot frame 101 into a desired angular position to achieve a desired ground clearance of the front end of the tank trailer 102. In the embodiment illustrated in FIGS. 4A-4D, the latch assembly 130 includes a pair of spaced apart latch brackets 131, 132, a transverse brace 133 extending between and interconnecting the latch brackets 131, 132, a rear support stiffener 134 extending along the transverse brace 133, a vertical brace 135 extending between the transverse brace 133 and the intermediate horizontal wall 111 of the tank trailer 102, and a pair of angled braces 136, 137 extending between the transverse brace 133 and the intermediate horizontal wall 111 of the tank trailer 102. In one or more alternate embodiments, the latch assembly 130 may have any other suitable number of braces 133, 135, 136, 137, such as, for instance, from one to six braces. Additionally, the braces 133, 135, 136, 137 may have any other suitable configuration. The braces 133, 135, 136, 137 may have any suitable shapes, such as, for instance, square or rectangular posts, I-beams, C-channels, or square or rectangular tubing. Additionally, in the illustrated embodiment, the rear support stiffener 134 is a rectangular plate, although the rear support stiffener 134 may have any other suitable shape, such as, for instance, triangular or semi-circular, and still fall within the scope and spirit of the present disclosure.

Still referring to the embodiment illustrated in FIGS. 4A-4D, each latch bracket 131, 132 is a generally trapezoidal plate, although the latch brackets 131, 132 may have any other suitable shape and still fall within the scope and spirit of the present disclosure. Each of the latch brackets 131, 132 also defines a rectangular notch 138 in an upper edge 139 of the latch bracket 131, 132. The rectangular notches 138 in the latch brackets 131, 132 are configured to receive one of the transverse support members 114 on the intermediate horizontal wall 111 of the tank trailer 102. Accordingly, the latch brackets 131, 132 may be coupled to the intermediate horizontal wall 111 and/or one of the transverse support members 114 of the trailer 102 by any suitable means, such as, for instance, welding, bonding, fastening, or any combination thereof.

With continued reference to FIGS. 4A-4D, each latch bracket 131, 132 also defines a plurality of openings (e.g., holes). In the illustrated embodiment, each latch bracket 131, 132 defines a lower opening 140, a middle opening 141, and an upper opening 142. In one embodiment, the lower, middle, and upper openings 140, 141, 142, respectively, are defined along an arc having a center point concentric with an axis of rotation of the pivot frame 101. Although each latch bracket 131, 132 in the illustrated embodiment defines three openings 140, 141, 142, in one or more alternate embodiments, each latch bracket 131, 132 may define any other suitable number of openings, such as, for instance, from two to five openings. Each of the openings 140, 141, 142 in the latch brackets 131, 132 is configured to receive a bushing (e.g., a tube bushing). In the illustrated embodiment, each latch bracket 131, 132 includes a lower bushing 143, a middle bushing 144, and an upper bushing 145 received in the lower opening 140, the middle opening 141, and the upper opening 142, respectively. Each pair of openings 140, 141, 142 and corresponding bushings 143, 144, 145 in the latch brackets 131, 132 is associated with a different angular position of the pivot frame 101 (i.e., the pair of lower openings 140 and lower bushings 143, the pair of middle openings 141 and middle bushings 144, and the pair of upper openings 142 and upper bushings 145 each correspond to a different angular position of the pivot frame 101). Additionally, as described below, the openings 140, 141, 142 and bushings 143, 144, 145 in the latch brackets 131, 132 are configured to receive the spring-loaded latch pin assemblies 103 to lock the pivot frame 101 into the desired angular position.

As described above, pivoting (arrow 104) the pivot frame 101 into different angular positions is configured to adjust the ground clearance of the front end of the tank trailer 102. In one embodiment, the latch assembly 130 is configured such that when the pivot frame 101 is coupled to the pair of lower openings 140 and corresponding lower bushings 143 in the latch assembly 130 by the spring-loaded latch pin assemblies 103, the front end of the tank trailer 102 rests on the ground. In one embodiment, the latch assembly 130 is configured such that when the pivot frame 101 is coupled to the pair of middle openings 141 and corresponding middle bushings 144 in the latch assembly 130, the front end of the tank trailer 102 has a ground clearance of approximately 10 inches. In one embodiment, the latch assembly 130 is configured such that when the pivot frame 101 is coupled to the pair of upper openings 142 and corresponding upper bushings 145 in the latch assembly 130, the front end of the trailer 102 has a ground clearance of approximately 16 inches. In one or more alternate embodiments, the openings 140, 141, 142 and corresponding bushings 143, 144, 145 in the latch assembly 130 may be arranged such that the pivot frame 101 is configured to lift the front end of the trailer 102 to achieve any other desired ground clearances.

With reference again to the embodiment illustrated in FIGS. 2A-2C, the adjustable kingpin assembly 100 also includes a support assembly 150 coupled to the intermediate vertical wall 110 of the tank trailer 102. The support assembly 150 supports the one or more bladders or airbags 126 that are configured to rotate (see arrow 104 in FIG. 1B) the pivot frame 101 into different angular positions. In the embodiment illustrated in FIGS. 5A-5C, the support assembly 150 includes a mounting plate 151, a pair of side support plates 152, 153 on opposite ends of the mounting plate 151, and a pair of gussets 154, 155 (see FIGS. 2A-2C) extending between a lower surface 156 of the mounting plate 151 and the intermediate vertical wall 110 of the tank trailer 102. In the illustrated embodiment of FIG. 2C, the support assembly 150 also includes a pair of rectangular weld plates 157, 158 provided between the intermediate vertical wall 110 of the tank trailer 102 and the pair of gussets 154, 155, respectively. The weld plates 157, 158 are configured to facilitate attachment of the gussets 154, 155 to the intermediate vertical wall 110 of the tank trailer 102. The mounting plate 151 includes a plurality of openings 159 (e.g., holes) configured to receive fasteners securing the one or more bladders or airbags 126 to an upper surface 160 of the mounting plate 151. In the illustrated embodiment, the side support plates 152, 153 are triangular, although in one or more alternate embodiments, the side support plates 152, 153 may have any other suitable shape, such as, for instance, rectangular. The side support plates 152, 153 may be coupled to the intermediate vertical wall 110 and/or the vertical support members 115 on the intermediate vertical wall 110 of the tank trailer 102. The support assembly 150 may be coupled to the tank trailer 102 by any suitable means, such as, for instance, welding, bonding, fastening, or any combination thereof.

With reference now to the embodiment illustrated in FIGS. 6A-6D, the pivot frame 101 includes a first longitudinal member 161 and a second longitudinal member 162 spaced apart from the first longitudinal member 161. The longitudinal members 161, 162 may have any suitable shape, such as, for instance, square or rectangular posts, I-beams, C-channels, or square or rectangular tubing. In the illustrated embodiment, each longitudinal member 161, 162 is an I-beam having a top plate 163, a bottom plate 164, and a vertical web 165 extending between the top and bottom plates 163, 164, respectively. In the illustrated embodiment, the longitudinal members 161, 162 are bent or kinked such that front portions 166 of the longitudinal members 161, 162 define an acute angle α relative to rear portions 167 of the longitudinal members 161, 162. It will be appreciated that the bent longitudinal members 161, 162 increase the maximum potential angular rotation (arrow 104) of the pivot frame 101 about the clevises 116, as illustrated in FIG. 1B. Otherwise, the longitudinal members 161, 162 may strike the intermediate horizontal wall 111 of the tank trailer 102 when pivoting (arrow 104) into different angular positions, thereby limiting the maximum potential rotation (arrow 104) of the pivot frame 101. In one or more alternate embodiments, however, the longitudinal members 161, 162 may be straight.

With continued reference to FIGS. 6A-6D, the web 165 of each longitudinal member 161, 162 defines a central opening 168 (e.g., a hole). In the illustrated embodiment, the central openings 168 are located at the bends between the front and rear portions 166, 167 of the longitudinal members 161, 162, respectively. The central openings 168 are each configured to receive a bearing 169. As described in more detail below, the pivot frame 101 is configured to pivot (arrow 104) about an axis extending through the bearings 169. In the illustrated embodiment, the pivot frame 101 also includes a pair of fish plates 170, 171 coupled to inner and outer surfaces, respectively, of each of the webs 165 of the longitudinal members 161, 162. Each of the fish plates 170, 171 also defines an opening 172 configured to align with the central openings 168 in the webs 165 of the longitudinal members 161, 162. The fish plates 170, 171 are configured to reinforce the webs 165 of the longitudinal members 161, 162 around the central openings 168.

Additionally, in the illustrated embodiment of FIGS. 6A-6D, the pivot frame 101 includes a pair of shear plates 173, 174 coupled to the inner and outer surfaces, respectively, of each of the webs 165 of the longitudinal members 161, 162. In the illustrated embodiment, each shear plate 173, 174 includes a standoff plate 175 and a pair of flanges 176, 177 on opposite ends of the standoff plate 175. The shear plates 173, 174 may be coupled to the webs 165 of the longitudinal members 161, 162 by any suitable means, such as, for instance, welding, bonding, fastening, or any combination thereof. Each shear plate 173, 174 also defines an opening 178 in the standoff plate 175 configured to align with the central openings 168 in the webs 165 of the longitudinal members 161, 162, respectively, and the openings 172 in the fish plates 173, 174. The openings 178 in the shear plates 173, 174 are configured to receive and support the bearings 169. Accordingly, each bearing 169 is configured to extend through the openings 178 in the shear plates 173, 174, the openings 172 in the fish plates 170, 171, and the central opening 168 in the web 165 of the longitudinal member 161, 162.

With continued reference to the embodiment illustrated in FIGS. 6A-6D, the web 165 of each longitudinal member 161, 162, respectively, also defines an aft opening 179 (e.g., a hole). The aft openings 179 in the longitudinal members 161, 162 are each configured to receive an aft bushing 180 (e.g., a tube bushing). As described below, the aft bushings 180 are configured to rotatably support a rocker plate assembly 181. In the illustrated embodiment, the pivot frame 101 also includes an aft shear plate 182 coupled to each of the longitudinal members 161, 162. The aft shear plates 182 are coupled to the outer surfaces of the webs 165 of the longitudinal members 161, 162, respectively. The aft shear plates 182 may be coupled to the longitudinal members 161, 162, respectively, by any suitable means, such as, for instance, welding, bonding, fastening, or any combination thereof. Each of the aft shear plates 182 includes a standoff plate 183 and a pair of inwardly turned flanges 184, 185 on opposite ends of the standoff plate 183. The standoff plate 183 of each aft shear plate 182 also defines an opening 186. The openings 186 in the aft shear plates 182 are configured to align with the aft openings 179 in the longitudinal members 161, 162, respectively. The openings 186 in the aft shear plates 182 are configured to receive and support the aft bushings 180. Accordingly, the aft bushings 180 are configured to extend through the aft openings 179 in the webs 165 of the longitudinal members 161, 162 and the aligned openings 186 in the aft shear plates 182.

Still referring to the embodiment illustrated in FIGS. 6A-6D, the web 165 of each longitudinal member 161, 162 also defines an intermediate opening 187 (e.g., a hole) located between the central openings 168 and the aft openings 179. The intermediate openings 187 in the longitudinal members 161, 162 are each configured to receive an intermediate bushing 188 (e.g., a tube bushing). As described below, and illustrated in FIG. 8A, the intermediate bushings 188 are configured to receive the spring-loaded latch pin assemblies 103 coupling the pivot frame 101 to the latch assembly 130 (i.e., the spring-loaded latch pin assemblies 103 are configured to extend through the intermediate bushings 188 in the pivot frame 101 and into either the pair of lower bushings 143, middle bushings 144, or upper bushings 145 in the latch assembly 130 to lock the pivot frame 101 into the desired angular position).

In the embodiment illustrated in FIGS. 6A-6D, the pivot frame 101 also includes an intermediate shear plate 189 coupled to each longitudinal member 161, 162. The intermediate shear plates 189 are coupled to the inner surfaces of the webs 165 of the longitudinal members 161, 162. The intermediate shear plates 189 may be coupled to the longitudinal members 161, 162 by any suitable means, such as, for instance, welding, bonding, fastening, or any combination thereof. Each of the intermediate shear plates 189 includes a standoff plate 190 and a pair of outwardly turned flanges 191, 192 on opposite ends of the standoff plate 190. The standoff plate 190 of each intermediate shear plate 189 also defines an opening 193. The openings 193 in the intermediate shear plates 189 are configured to align with the intermediate openings 187 in the longitudinal members 161, 162. Additionally, the openings 193 in the intermediate shear plates 189 are configured to receive and support the intermediate bushings 188. Accordingly, the intermediate bushings 188 are configured to extend through the intermediate openings 187 in the webs 165 of the longitudinal members 161, 162 and the openings 193 in the intermediate shear plates 189.

In the embodiment illustrated in FIGS. 6A-6D, the pivot frame 101 also includes three transverse members 194, 195, 196 extending between and interconnecting the longitudinal members 161, 162. In one or more alternate embodiments, the pivot frame 101 may have any other suitable number of transverse members 194, 195, 196, such as, for instance, from one to six transverse members, and still fall within the scope and spirit of the present disclosure. The transverse members 194, 195, 196 may have any suitable shape, such as, for instance, square or rectangular posts, I-beams, C-channels, or square or rectangular tubing. In the illustrated embodiment, the pivot frame 101 also includes a nose bar 197 extending transversely between forward ends of the longitudinal members 161, 162.

Still referring to the embodiment illustrated in FIGS. 6A-6D, the pivot frame 101 also includes a kingpin plate 198 coupled to two of the transverse support members 195, 196 and the nose bar 197. The pivot frame 101 also includes a kingpin 199 extending downward from the kingpin plate 198. As described above, the kingpin 199 is configured to be detachably connected to a fifth wheel on a truck or tractor such that the truck or tractor may tow the tank trailer 102.

With reference now to the embodiment illustrated in FIGS. 7A-7E, the adjustable kingpin assembly 100 also includes the rocker plate assembly 181 coupled to a rear end of the pivot frame 101. The one or more airbags or bladders 126 are configured to engage the rocker plate assembly 181 to drive the angular position of the pivot frame 101 (i.e., the engagement between the one or more airbags or bladders 126 and the rocker plate assembly 181 pivots (arrow 104) the pivot frame 101 into the desired angular position). The rocker plate assembly 181 is configured to compensate for the angular rotation (arrow 104) of the pivot frame 101 such that the one or more bladders 126 remain flush against the rocker plate assembly 181. In particular, the rocker plate assembly 181 is configured to pivot (arrow 200) in a direction opposite to the direction of rotation (arrow 104) of the pivot frame 101 such that the position of the rocker plate assembly 181 relative to the one or more bladders 126 remains substantially constant. In one embodiment, the rocker plate assembly 181 is configured to rotate (arrow 200) such that the rocker plate assembly 181 remains substantially parallel to the support assembly 150 coupled to the intermediate vertical wall 110 of the tank trailer 102 (see FIGS. 1A and 2B), even as the pivot frame 101 pivots (arrow 104) into different angular positions. Maintaining alignment between the one or more bladders 126 and the portion of the pivot frame 101 that is engaged by the one or more bladders 126 is configured to maintain the efficacy of the one or bladders 126 in driving the pivot frame 101 into different angular positions. Otherwise, the angular misalignment between the one or more bladders 126 and the portion of the pivot frame 101 that is engaged by the one or more bladders 126 may reduce the efficacy of the bladders 126 in driving the pivot frame 101 into different angular positions. In one or more alternate embodiments, however, the adjustable kingpin assembly 100 may be provided without the rocker plate assembly 181.

In the embodiment illustrated in FIGS. 7A-7E, the rocker plate assembly 181 includes an upper airbag mount plate 201 having a lower surface 202 and an upper surface 203 opposite the lower surface 202. The rocker plate assembly 181 also includes a plurality of gussets 204 coupled to the upper surface 203 of the upper airbag mount plate 201. In the illustrated embodiment, the rocker plate assembly 181 further includes a stiffener 205 extending lengthwise along the upper surface 203 of the airbag mount plate 201 and coupled to each of the gussets 204. Although in the illustrated embodiment the rocker plate assembly 181 includes six gussets 204, in one or more alternate embodiments, the rocker plate assembly 181 may include any other suitable number of gussets 204, such as, for instance, from one to ten gussets 204. Additionally, in the illustrated embodiment, each gusset 204 is triangular, although the gussets 204 may have any other suitable shapes, such as, for instance, semi-circular or trapezoidal, and still fall within the scope and spirit of the present disclosure. Each gusset 204 also defines a circular opening 206 and a narrow slot 207 extending between the circular opening 206 and a lower edge 208 of the gusset 204. The narrow slots 207 in the gussets 204 are configured to receive the stiffener 205. The circular openings 206 in the gussets 204 are configured to receive a bushing 209. Additionally, a rod 210 about which the rocker plate assembly 181 is configured to pivot (arrow 200) extends through the aft bushings 180 in the longitudinal members 161, 162 of the pivot frame 101 and through the bushing 209 in the gussets 204 of the rocker plate assembly 181 (i.e., the rod 210 extends through the bushings 180, 209 to pivotally couple the rocker plate assembly 181 to the pivot frame 101).

Figure 8A:
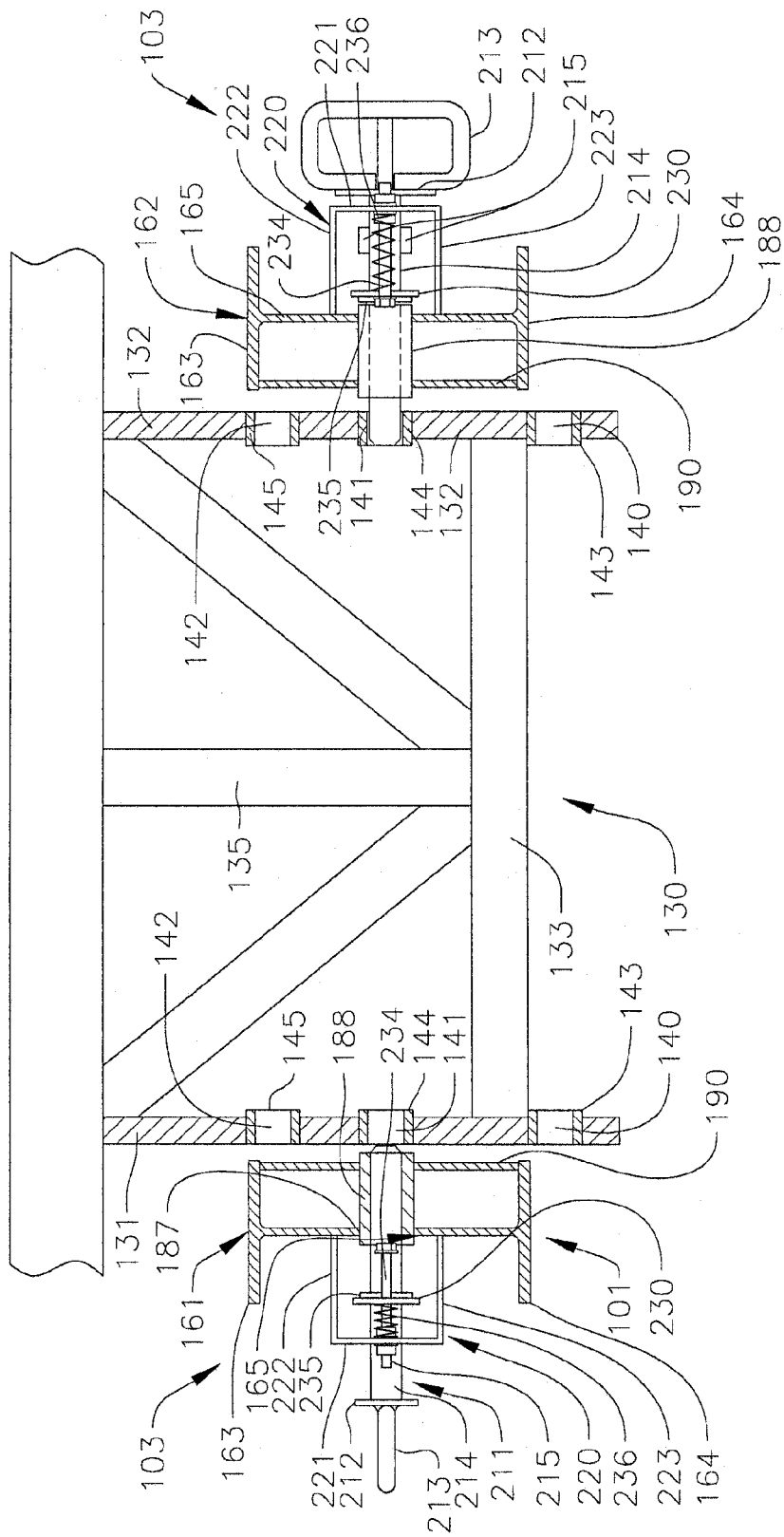
FIG. 8A is a front view of a spring-loaded latch pin assembly in an unlatched position and a spring-loaded latch pin assembly in a latched position, according to one embodiment of the present disclosure.

With reference now to the embodiment illustrated in FIG. 8A, the adjustable kingpin assembly 100 includes two spring-loaded latch pin assemblies 103 coupled to the pivot frame 101. Each spring-loaded latch pin assembly 103 is configured to move between a latched position (shown by the right spring-loaded latch pin 103 assembly in FIG. 8A) and an unlatched position (shown by the left spring-loaded latch pin assembly 103 in FIG. 8A). In the latched position, the spring-loaded latch pin assemblies 103 are configured to detachably couple the pivot frame 101 to the latch assembly 130 to lock the pivot frame 101 into the desired angular position. In particular, in the latched position, the spring-loaded latch pin assemblies 103 extend through the intermediate openings 187 and corresponding intermediate bushings 188 in the pivot frame 101 and into the desired one of the three sets of openings 140, 141, 142 and corresponding bushings 143, 144, 145 in the latch assembly 130 (i.e., the spring-loaded latch pin assemblies 103 are configured to selectively couple the pivot frame 101 to the pair of lower openings 140 and lower bushings 143, the pair of middle openings 141 and middle bushings 144, or the pair of upper openings 142 and upper bushings 145 in the latch assembly 130). In the unlatched position, the spring-loaded latch pin assemblies 103 are disengaged from the latch assembly 130 such that the pivot frame 101 is configured to freely pivot (arrow 104) into any desired angular position (i.e., in the unlatched position, the spring-loaded latch pin assemblies 103 decouple the pivot frame 101 from the latch assembly 130 such that the one or more bladders or airbags 126 may freely drive the pivot frame 101 into any desired angular position).

With continued reference to the embodiment illustrated in FIG. 8A, each spring-loaded latch pin assembly 103 includes a pin 211 (see also FIG. 8B), a handle plate 212 (see also FIG.

8C) coupled to an outer end of the pin 211, and a handle 213 (see also FIG. 8D) coupled to the handle plate 212. The pin 211 includes a primary cylindrical rod 214 and a pair of cylindrical lock-out rods 215 circumferentially disposed around the primary rod 214. In the illustrated embodiment, the lock-out rods 215 are diametrically opposed on the primary rod 214. As described in more detail below, the primary cylindrical rod 214 is configured to extend through the intermediate bushings 188 in the pivot frame 101 and into a selected one of the bushings 143, 144, 145 in the latch assembly 130 when the spring-loaded latch pin 103 is in the latched position. The lock-out rods 215 are configured to lock the spring-loaded latch pin assemblies 103 in the unlatched position.

With continued reference to the embodiment illustrated in FIG. 8A, each spring-loaded latch pin assembly 103 also includes a latch bracket 220. In the illustrated embodiment, the latch bracket 220 is C-channel having a faceplate 221 and a pair of legs 222, 223 extending inward from opposite sides of the faceplate 221. The legs 222, 223 of the latch bracket 220 are coupled to the webs 165 of the longitudinal members 161, 162 of the pivot frame 101 by any suitable means, such as, for instance, welding, bonding, fastening, or any combination thereof. As illustrated in FIG. 8E, the faceplate 221 of the latch bracket 220 defines a keyhole-shaped opening 224, the significance of which is described below. The keyhole-shaped opening 224 in the latch bracket 220 includes a circular opening 225 and a pair of smaller arcuate notches 226, 227 circumferentially disposed around the circular opening 225. The faceplate 221 of the latch bracket 220 also defines a pair of openings 228, 229 (e.g., holes) on opposite sides of the keyhole-shaped opening 224.

Still referring to the embodiment illustrated in FIG. 8A, each spring-loaded latch pin assembly 103 also includes a diamond-shaped latch plate 230 coupled to the primary rod 214. As illustrated in FIG. 8F, the diamond-shaped latch plate 230 defines a central opening 231 and a pair of openings 232, 233 on opposite sides of the central opening 231. The central opening 231 in the latch plate 230 receives the primary rod 214. Each spring-loaded latch pin assembly 103 also includes a pair of guide pins or guide bolts 234 (see also FIG. 8G). The guide bolts 234 extend through the openings 232, 233 in the diamond-shaped latch plate 230 and the openings 228, 229 in the latch bracket 220. Each spring-loaded latch pin assembly 103 also includes a pair of compression springs 236 wound around the guide bolts 234. The compression springs 236 are configured to bias the spring-loaded latch pin assembly 103 into the latched position. The diamond-shaped latch plate 230 is configured to slide along the guide bolts 234 as the spring-loaded latch pin assembly 103 moves between the latched position and the unlatched position. In the illustrated embodiment, each spring-loaded latch pin assembly 103 also includes a stop ring 235 (see FIG. 8H) coupled to an inner surface of the diamond-shaped latch plate 230. The stop rings 235 are configured to about the intermediate bushings 188 in the pivot frame 101 when the spring-loaded latch pin assemblies 103 are in the latched position.

In operation, a user may move the spring-loaded latch pin assembly 103 into the unlatched position by pulling the handle 213 outward with sufficient force to overcome the biasing force of the compressive springs. As the handle 213 is pulled outward, the lock-out rods 215 on the pin 211 are drawn outward through the arcuate notches 226, 227 in the latch bracket 220. Once the lock-out rods 215 have passed through the arcuate notches 226, 227 in the latch bracket 220, the user may rotate the handle 213, such as, for instance, approximately 90 degrees, into a rotated position, as shown in the left spring-loaded latch pin assembly 103 of FIG. 8A. In the rotated position, the lock-out rods 215 are not aligned with the arcuate notches 226, 227 in the latch bracket 220. Instead, in the rotated position, the lock-out rods 215 are aligned with an outer surface of the latch bracket 220. Accordingly, in the rotated position, the lock-out rods 215 are configured to abut the outer surface of the latch bracket 220 and thereby prevent the compressive springs 236 from forcing the pin 211 into the engaged position (i.e., the engagement between the lock-out rods 215 on the pin 211 and the outer surface of the latch bracket 220 is configured to lock the spring-loaded latch pin assembly 103 into the disengaged position). As described above, in the disengaged position, the one or more bladders 126 are able to freely rotate (arrow 104) the pivot frame 101 into any desired angular position.

Once the pivot frame 101 has been rotated (arrow 104) into the desired angular position by the one or more airbags or bladders 126, the user may return the spring-loaded latch pin assemblies 103 to the engaged position to lock the pivot frame 101 into the desired angular position. To return the spring-loaded latch pin assemblies 103 to the engaged position, the user may rotate the handle 213 until the lock-out rods 215 on the pin 211 are aligned with the arcuate notches 226, 227 in the latch bracket 220. The user may then either release the handle 213 or guide the handle 213 inward. In either case, the biasing force of the compressive springs 236 is configured to draw the lock-out rods 215 inward through the arcuate notches 226, 227 in the latch bracket 220 and force the primary rod 214 inward until it extends through the intermediate bushing 188 in the pivot frame 101 and into a selected one of the bushings 143, 144, 145 in the latch assembly 130. As described above, in the engaged position, the spring-loaded latch pin assemblies 103 detachably couple the pivot frame 101 to the latch assembly 130 and thereby lock the pivot frame 101 into the desired angular position.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "vertical," "horizontal," and similar terms have been used herein to describe a spatial relationship of one element to another, it is understood that these terms are intended to encompass different orientations of the various elements and components of the invention in addition to the orientation depicted in the figures. Additionally, as used herein, the term "substantially" and similar terms are used as terms of approximation and not as terms of degree, and are intended to account for the inherent deviations in measured or calculated values that would be recognized by those of ordinary skill in the art. Moreover, when a component is referred to as being "coupled" to another component, it can be directly attached to the other component or intervening components may be present therebetween.

What is claimed is:

1. A trailer having an adjustable kingpin assembly, comprising:
    a pivot frame including a kingpin pivotally coupled to the trailer and configured to pivot about a first axis between a first angular position and a second angular position to adjust a ground clearance of the trailer;

a rocker plate assembly pivotally coupled to the pivot frame and configured to pivot about a second axis offset from the first axis to compensate for the pivoting of the pivot frame between the first and second angular positions; and at least one bladder engaging the rocker plate assembly to rotate the pivot frame between the first angular position and the second angular position, wherein the pivoting of the rocker plate assembly about the second axis is configured to maintain a relatively constant angle between the rocker plate assembly and the at least one bladder as the pivot frame pivots about the first axis between the first angular position and the second angular position.

2. The trailer of claim 1, further comprising at least one clevis coupled to the trailer, wherein the pivot frame is pivotally coupled to the at least one clevis.

3. The trailer of claim 1, further comprising a support assembly coupled to the trailer and supporting the at least one bladder.

4. The trailer of claim 1, further comprising at least one spring-loaded latch pin configured to selectively lock the pivot frame into the first angular position and the second angular position.

5. The trailer of claim 4, further comprising at least one latch bracket coupled to the trailer and configured to receive the at least one spring-loaded latch pin.

6. The trailer of claim 1, wherein the trailer is a fluid storage tank.

7. The trailer of claim 1, wherein the pivot frame is further configured to pivot into a third angular position.

8. The trailer of claim 1, wherein the kingpin is pivotally coupled to a first end portion of the pivot frame, the rocker plate assembly is pivotally coupled to a second end portion of the pivot frame opposite the first end portion of the pivot frame, and the first axis is at an intermediate portion of the pivot frame between the first and second end portions of the pivot frame.

9. The trailer of claim 1, wherein, when the pivot frame pivots between the first angular position and the second angular position, the pivot frame rotates in a first direction and the rocker plate assembly rotates in a second direction opposite the first direction.

10. A trailer having an adjustable kingpin assembly, comprising:
a pivot frame including a kingpin pivotally coupled to the trailer and configured to pivot between a first angular position and a second angular position to adjust a ground clearance of the trailer;

at least one bladder configured to rotate the pivot frame between the first angular position and the second angular position; and at least one spring-loaded latch pin configured to selectively lock the pivot frame into the first angular position and the second angular position.

11. The trailer of claim 10, further comprising at least one clevis coupled to the trailer, wherein the pivot frame is pivotally coupled to the at least one clevis.

12. The trailer of claim 10, wherein the pivot frame is further configured to pivot into a third angular position.

13. The trailer of claim 10, further comprising a support assembly coupled to the trailer and supporting the at least one bladder.

14. The trailer of claim 10, wherein the trailer is a fluid storage tank.

15. The trailer of claim 10, wherein the at least one spring-loaded latch pin comprises:
a pin configured to slide between a latched position locking the pivot frame into one of the first and second angular positions and an unlatched position configured to allow the pivot frame to pivot between the first and second angular positions, the pin comprising:
a primary rod; and
at least one lock-out rod coupled to the primary rod and configured to lock the pin in the unlatched position.

16. The trailer of claim 15, wherein the at least one spring-loaded latch pin further comprises a latch bracket defining a keyhole-shaped opening, wherein the at least one lock-out rod is configured to pass through the keyhole-shaped opening when the pin is in the latched position and the at least one lock-out rod is configured not to pass through the keyhole-shaped opening when the pin is in the unlatched position.

17. The trailer of claim 15, wherein the at least one spring-loaded latch pin further comprises:
at least one guide pin coupled to the pin; and
a spring wound around the at least one guide pin and configured to bias the pin into the latched position.

18. The trailer of claim 10, further comprising a rocker plate assembly pivotally coupled to the pivot frame and configured to pivot to compensate for the pivoting of the pivot frame between the first and second angular positions.

19. The trailer of claim 10, further comprising at least one latch bracket coupled to the trailer and configured to receive the at least one spring-loaded latch pin.

* * * * *